United States Patent Office 3,709,934
Patented Jan. 9, 1973

3,709,934
METHOD OF MAKING CARBOXYLIC ACID ANHYDRIDES
Wilhelm Gruber, Wolfgang Kleine-Doepke, and Peter Quis, Darmstadt, and Guenther Schroeder, Oberramstadt, Germany, assignors to Rohm & Haas G.m.b.H., Darmstadt, Germany
No Drawing. Filed Feb. 27, 1970, Ser. No. 15,266
Claims priority, application Germany, Mar. 1, 1969, P 19 10 463.3
Int. Cl. C07c 51/56
U.S. Cl. 260—546
12 Claims

ABSTRACT OF THE DISCLOSURE

Method of making carboxylic acid anhydrides by reacting dicyan and a carboxylic acid.

---

The present invention relates to methods for the preparation of carboxylic acid anhydrides.

A number of processes are available to the organic chemist for the preparation of carboxylic acid anhydrides proceeding either from the free carboxylic acids, or from their alkali salts, or from the corresponding acid chlorides. On a technical scale, the synthesis proceeding directly from a carboxylic acid is preferred since it avoids additional reaction steps. The free acids are reacted with compounds removing water, such as thionyl chloride, phosphorus oxychloride, acetyl chloride, acetic anhydride, or ketene. Halogen-containing agents for the cleavage of water must either be reacted in the presence of equivalent amounts of basic compounds, such as pyridine, or the hydrogen halides escaping in the form of gas must be reacted with alkali in special apparatus. For this reason, processes employing acetic anhydride or ketene have principally acquired practical significance on a technical scale (i.e., the so-called "transanhydridization"), since no auxiliary chemicals need to be employed. Acetic anhydride itself can be prepared simply and with good yield from acetic acid and ketene.

The process of "trans-anhydridization" with ketene or acetic anhydride has numerous disadvantages. As a by-product, the mixed anhydride of acetic acid and the carboxylic acid to be dehydrated is formed in an equilibrium reaction. The quantitative displacement of this equilibrium to form the desired anhydride postulates that acetic acid can be removed by distillation at the rate with which it is formed. This is possible only when the materials taking part in the reaction boil at appropriate temperatures. Further complications arise in the case of the reaction of unsaturated carboxylic acids. For example, in the reaction of methacrylic acid with acetic anhydride, a worthless bicyclic by-product is produced in considerable quantities in addition to methacrylic acid anhydride.

In the process according to the present invention, the only by-products formed are cyanformamide or oxamide, both involatile compounds which can be easily separated. Oxamide can be separated from the anhydride formed by filtration, whereas cyanformamide remains behind when anhydride is distilled from the liquid phase. The preparation of anhydrides of unsaturated carboxylic acids, particularly of methacrylic acid, proceeds without difficulties and therefore constitutes a preferred embodiment of the present invention.

The new process for the preparation of carboxylic anhydrides involves the reaction of a carboxylic acid with dicyan under anhydrous conditions. According to the net reaction scheme:

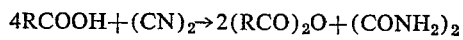

wherein four mols of carboxylic acid are converted to the anhydride by one mol of dicyan. In practice, however, the reagents can also be reacted in amounts which depart from the stoichiometric relationship. The stoichiometry of the reaction is displaced in the direction of a higher consumption of dicyan per mol of carboxylic acid if cyanformamide is formed in addition to or in place of oxamide. This is particularly the case if the reaction is carried out at low reaction temperatures or if alkaline catalysts, such as alkali acetates or amines, are employed. On the other hand, heavy metal containing catalysts and high reaction temperatures promote the course of the reaction according to the formula given above with formation of oxamide.

The mechanism of the reaction is not exactly known. However, there are indications that a compound of the formula

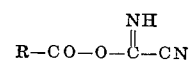

is formed as an intermediate product which is then capable of acylating a carboxylic acid molecule with formation of the anhydride. The second nitrile group of the dicyan can react in the same fashion.

Most carboxylic acids require a catalyst for reaction. For this purpose, those compounds containing carboxylate ions or which form carboxylate ions in the reaction medium are useful. For example, suitable materials include the alkali metal, alkaline earth metal, and heavy metal salts of fatty acids having up to 18 carbon atoms, such as sodium acetate, calcium propionate, zinc acetate, cadmium acetate, copper acetate, cobalt acetate, or manganese acetate, as well as compounds which are sufficiently basic to form carboxylate ions from the carboxylic acids to be reacted. Such compounds include the alkali metal and alkaline earth metal alcoholates, hydroxides, and carbonates, and organic bases, i.e., amines. Examples of such compounds are magnesium ethylate, sodium hydroxide or carbonate, pyridine, diethylamine, triethylenediamine, or imidazole. Further, the reaction is catalyzed by Lewis acids, i.e., by compounds such as aluminum chloride, iron chloride, titanium tetrachloride, or nickel bromide. Nickel salts, for example, also nickel acetate, have proved particularly effective. It is common to all the above-mentioned catalysts that they form corresponding carboxylates in the reaction mixture, at least in part, by reaction with the carboxylic acid employed. The carboxylates so formed act as catalysts.

The reaction is carried out at temperatures of from 0° C. to 200° C., preferably from 50° C. to 150° C., in the presence or absence of an inert organic solvent, by introducing gaseous dicyan into the reaction mixture until the reaction is complete, or by adding a solution of dicyan in a solvent. It is self-evident that the reaction medium cannot contain water if a loss of yield by hydrolysis of the anhydride formed is to be avoided, i.e., an "inert" solvent is an anhydrous solvent. Further, solvents capable of acylation, such as alcohols, are unsuitable. Appropriate solvents include, for example, aliphatic and aromatic hydrocarbons and halohydrocarbons such as petroleum ether, benzene, and carbon tetrachloride, cyclic and acyclic ethers such as dioxane, tetrahydrofurane, and ethyl ether, esters such as ethyl acetate, and many others known to the skilled organic chemist.

During the reaction, oxamide precipitates and is filtered off at the conclusion of the reaction. It has proved useful to fractionate the filtrate, which may contain unreacted free carboxylic acid in addition to the anhydride, by distillation. To the extent that cyanformamide may arise during the reaction, it remains behind during the distillative removal of the anhydride.

The reaction can be applied to aliphatic saturated or unsaturated carboxylic acids, particularly to lower alkanoic or alkenoic acids such as acetic acid, propionic acid, butyric acid, or valerianic acid, acrylic acid, methacrylic acid, crotonic acid, and the like, as well as higher fatty acids and to aromatic or araliphatic carboxylic acids, particularly to phene acids such as benzoic acid or phenyl acetic acid.

A better understanding of the present invention and of its many advantages will be had by referring to the following specific examples given by way of illustration.

EXAMPLES 1–11

The reaction of acetic acid with dicyan

The reaction conditions, such as the batch size, catalyst, reaction temperature, and reaction time, as well as the amount of reaction product obtained, are evident from Table I below. In the tests of these examples, acetic acid and the catalyst were first combined and then gaseous dicyan introduced. The reaction mixtures were subsequently filtered and the filtrate was further treated by fractional distillation.

EXAMPLE 16

100 grams of methacrylic acid, stabilized as in Examples 13–15 and dissolved in 100 g. of petroleum ether, were reacted with 12 g. of dicyan in an autoclave at 70° C. in the presence of 3 g. of nickel acetate. After 3 hours, the reaction was interrupted. Methacrylic acid anhydride and oxamide were respectively formed in yields of 41.3 percent of theory and 51.7 percent of theory.

EXAMPLE 17

340 g. of dicyan were introduced into 2000 g. of stabilized methacrylic acid over the course of 7 hours at 70° C. The batch contained 60 g. of nickel acetate as a catalyst. After an additional four hours, the batch was worked up. 413 g. of oxamide and 1560 g. of methacrylic acid anhydride were obtained.

EXAMPLE 18

3 g. of nickel acetate were added to a solution of 122 g. of benzoic acid in 200 g. of ethyl acetate. 24.9 g. of dicyan were introduced at 70° C. over a period of three hours, and the mixture was then permitted to react for an additional 2 hours. Precipitated oxamide was removed by filtration and the solvent was then removed from the filtrate by distillation. The distillation residue contained benzoic acid anhydride and cyanformamide in addition to benzoic acid.

What is claimed is:

1. The method of making a carboxylic acid anhydride which comprises contacting dicyan and a carboxylic acid under anhydrous conditions for a period of 3–11 hours at a temperature from 0° C. to 200° C. in the presence of a catalyst containing carboxyl ions or forming catalytic carboxyl ions by reaction with said carboxylic acid, whereby a reaction mixture comprising the anhydride of said carboxylic acid in combination with at least one by-product selected from the group consisting of oxamide and cyanformamide is formed, and then separating said anhydride from said by-product.

2. The method as in claim 1 wherein catalytic carboxyl ions are formed in situ from said carboxylic acid and an amine base.

3. The method as in claim 1 wherein the reagents are reacted in an inert organic solvent.

4. The method as in claim 1 wherein said carboxylic acid is a lower alkanoic acid.

TABLE I

| Example number | Acetic acid (g.) | Dicyan (g.) | Catalyst | Temperature (° C.) | Reaction time (hours) | Yield Acetic acid anhydride (g.) | Oxamide (g.) | Cyanformamide (g.) |
| --- | --- | --- | --- | --- | --- | --- | --- | --- |
| 1 | 100 | 18 | 3 g. lithium acetate | 40 | 6 | 14.2 |  | 10.8 |
| 2 | 100 | 37 | 3 g. sodium acetate | 80 | 5 | 28.5 | 2.7 | 20.5 |
| 3 | 100 | 32 | 3 g. potassium acetate | 70 | 5 | 29 | 1.1 | 36.8 |
| 4 | 100 | 37 | 3 g. copper oleate | 70 | 7 | 60 | 19.5 | 7.8 |
| 5 | 200 | 66.4 | 6 g. cadmium acetate | 70 | 6 | 130 | 27.4 | 30.0 |
| 6 | 200 | 35 | 6 g. cadmium acetate | 20 | 6 | 25 | traces | 20 |
| 7 | 100 | 30 | 3 g. zinc acetate | 80 | 8 | 34 | 3.7 | 19.4 |
| 8 | 100 | 44 | 3 g. cobalt acetate | 70 | 4 | 60 | 25.6 |  |
| 9 | 100 | 22 | 3 g. pyridine | 40 | 6 | 30 |  | 21.9 |
| 10 | 100 | 24 | 3 g. diethylamine | 40 | 7 | 11 |  | 8.1 |
| 11 | 100 | 16 | 3 g. tributylamine | 40 | 5 | 18 |  | 13.7 |

EXAMPLE 12

36 grams of gaseous dicyan were introduced into 100 grams of propionic acid containing 2 grams of copper acetate at a temperature of 70° C. over a period of four hours. Oxamide precipitated and was separated by filtration at the end of the reaction. 12.5 grams of oxamide were obtained. By distillation of the filtrate, 50.5 g. of propionic acid anhydride were obtained.

EXAMPLES 13–15

The reaction of methacrylic acid with dicyan 200 grams of methacrylic acid, stabilized with 0.2 g. of hydroquinone and 0.1 g. of indulin, were reacted with dicyan in an autoclave in the presence of a catalyst at 70° C. After three hours, the batch was further worked up. The results obtained are shown as a function of the catalyst in following Table II.

TABLE II

| Example number | Dicyan (g.) | Catalyst | Yield in percent of theory Methacrylic acid anhydride | Oxamide |
| --- | --- | --- | --- | --- |
| 13 | 34 | 6 g. nickel acetate | 78.3 | 62 |
| 14 | 35 | 6 g. titanium tetrachloride | 33.8 | 18.5 |
| 15 | 38 | 6 g. manganese acetate | 21.8 | 10.0 |

5. The method as in claim 1 wherein said carboxylic acid is a lower alkenoic acid.

6. The method as in claim 1 wherein said carboxylic acid is methacrylic acid.

7. The method as in claim 1 wherein said catalyst is a carboxylate of an alkali metal, of an alkaline earth metal, or of a heavy metal.

8. The method as in claim 1 wherein said temperature is between 50° C. and 150° C.

9. The method as in claim 1 wherein at least ¼ mol of dicyan is contacted per mol of carboxylic acid.

10. The method as in claim 1 wherein the reagents are reacted in the presence of a carboxylate formed in situ from said carboxylic acid.

11. The method as in claim 1 wherein the reagents are reacted in the presence of an alkali metal, alkaline earth metal, heavy metal, organic ammonium or pyridinium carboxylate formed in situ from said carboxylic acid.

12. The method as in claim 2 wherein said amine base is an aliphatic amine.

References Cited

UNITED STATES PATENTS 3,037,036  5/1962  Fierce et al. _____ 260—404.5

OTHER REFERENCES

Satchell, Quarterly Reviews, 17, 77 (1963).
Webb, Encyclopedia of Polymer Science and Technology, volume 7, p. 571 (1967).

LORRAINE A. WEINBERGER, Primary Examiner

R. GERSTL, Assistant Examiner